United States Patent
Lee (10) Patent No.: US 9,783,182 B2
(45) Date of Patent: Oct. 10, 2017

(54) CONTROL METHOD FOR FRONT AND REAR WHEEL TORQUE DISTRIBUTION OF ELECTRIC 4 WHEEL DRIVE HYBRID ELECTRIC VEHICLE

(71) Applicant: Hyundai Motor Company, Seoul (KR)

(72) Inventor: Min Su Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 166 days.

(21) Appl. No.: 14/928,327

(22) Filed: Oct. 30, 2015

(65) Prior Publication Data

US 2016/0297440 A1    Oct. 13, 2016

(30) Foreign Application Priority Data

Apr. 7, 2015  (KR) ................. 10-2015-0048788

(51) Int. Cl.

| | |
|---|---|
| *B60W 30/188* | (2012.01) |
| *B60W 40/114* | (2012.01) |
| *B60W 30/02* | (2012.01) |
| *B60W 10/08* | (2006.01) |
| *B60K 6/48* | (2007.10) |
| *B60W 10/06* | (2006.01) |
| *B60W 30/045* | (2012.01) |

(Continued)

(52) U.S. Cl.
CPC ............... *B60W 10/08* (2013.01); *B60K 6/48* (2013.01); *B60W 10/06* (2013.01); *B60W 20/15* (2016.01);

(Continued)

(58) Field of Classification Search
CPC ...... B60W 10/04; B60W 10/06; B60W 10/08; B60W 10/12; B60W 10/14; B60W 10/16;
(Continued)

(56) References Cited

U.S. PATENT DOCUMENTS 5,215,161 A * 6/1993 Kobayashi ............. B60K 17/35
                                                                180/248
5,599,075 A * 2/1997 Hara .................. B60K 23/0808
                                                                303/143

(Continued)

FOREIGN PATENT DOCUMENTS

CN        102463986 A  *  5/2012
JP        2004-003461       1/2004
(Continued)

*Primary Examiner* — Thomas G Black
*Assistant Examiner* — Sara Lewandroski
(74) *Attorney, Agent, or Firm* — Brinks Gilson & Lione (57) ABSTRACT

The present disclosure provides a control method for front and rear wheel torque distribution of an electric 4 wheel drive (E-4WD) hybrid electric vehicle. The control method includes: determining one of a fuel efficiency optimization mode and a 4WD mode from vehicle state information and driver's driving manipulation input information; calculating a driver request total torque amount; when the 4WD mode is determined, calculating a rear wheel torque amount for the 4WD; calculating a front wheel torque amount for the 4WD; calculating a front wheel engine torque amount for the 4WD; and controlling a torque output of an engine for front wheel driving and a torque output of a driving motor for rear wheel driving according to the calculated front wheel engine torque amount for 4WD and the calculated rear wheel torque amount for 4WD.

14 Claims, 2 Drawing Sheets

(51) Int. Cl.
*B60W 30/18* (2012.01)
*B60W 20/15* (2016.01)
*B60W 50/08* (2012.01)

(52) U.S. Cl.
CPC .... *B60W 30/045* (2013.01); *B60W 30/18145* (2013.01); *B60W 30/1882* (2013.01); *B60W 50/082* (2013.01); *B60W 2520/14* (2013.01); *B60W 2540/10* (2013.01); *B60W 2540/103* (2013.01); *B60W 2540/18* (2013.01); *B60W 2710/0666* (2013.01); *B60W 2710/083* (2013.01); *B60W 2720/403* (2013.01); *Y10S 903/902* (2013.01)

(58) Field of Classification Search
CPC ...... B60W 20/10; B60W 20/15; B60W 20/40; B60W 30/02; B60W 30/18; B60W 30/182; B60W 30/188; B60W 30/1882; B60W 50/08; B60W 50/082; B60W 50/10; B60K 6/20; B60K 6/22; Y10S 903/00; Y10S 903/902
See application file for complete search history.

(56) References Cited

U.S. PATENT DOCUMENTS

| | | | | |
|---|---|---|---|---|
| 5,927,425 A * | 7/1999 | Kusano | ............. | B60K 23/0808 180/248 |
| 5,978,726 A * | 11/1999 | Takeda | ............. | B60T 8/48 180/197 |
| 7,517,298 B2 | 4/2009 | Ortmann | | |
| 2002/0010538 A1* | 1/2002 | Uchida | ............. | B60K 6/46 701/101 |
| 2002/0056584 A1* | 5/2002 | Nakasako | ............. | B60K 6/48 180/248 |
| 2002/0105188 A1* | 8/2002 | Tomikawa | ............. | B60K 6/52 290/40 C |
| 2008/0004780 A1* | 1/2008 | Watanabe | ............. | B60K 6/40 701/54 |
| 2010/0106354 A1* | 4/2010 | Fauvel | ............. | B60K 6/52 701/22 |
| 2013/0297133 A1* | 11/2013 | Hasegawa | ............. | B60K 6/445 701/22 |
| 2014/0121870 A1* | 5/2014 | Lee | ............. | B60W 20/14 701/22 |
| 2015/0298679 A1* | 10/2015 | Sugitani | ............. | B60K 6/48 701/22 |

FOREIGN PATENT DOCUMENTS

| | | |
|---|---|---|
| JP | 2012-171616 | 9/2012 |
| KR | 10-2009-0011730 | 2/2009 |
| KR | 10-2012-0103938 A | 9/2012 |
| KR | 10-2012-0105774 A | 9/2012 |
| KR | 10-1214304 | 12/2012 |
| KR | 10-2013-0059202 | 6/2013 |
| KR | 10-2014-0051681 | 5/2014 |

* cited by examiner

CONTROL METHOD FOR FRONT AND REAR WHEEL TORQUE DISTRIBUTION OF ELECTRIC 4 WHEEL DRIVE HYBRID ELECTRIC VEHICLE

CROSS-REFERENCE TO RELATED APPLICATION

This application claims the benefit of Korean Patent Application No. 10-2015-0048788, filed on Apr. 7, 2015, which is hereby incorporated by reference in its entirety.

FIELD

The present disclosure relates to a control method for front and rear wheel torque distribution of an electric 4 wheel drive (E-4WD) hybrid electric vehicle to improve the driving performance and stability of the vehicle.

BACKGROUND

The statements in this section merely provide background information related to the present disclosure and may not constitute prior art.

In general, a hybrid electric vehicle is a vehicle driven by using, as driving sources, an internal combustion engine using fossil fuel and a motor using electric energy. The hybrid electric vehicle is an eco-friendly vehicle in which the energy of the fossil fuel and the electric energy are used together to drive the vehicle, thereby reducing exhaust gas and improving fuel efficiency.

A transmission mounted electric device (TMED) type in which a driving motor is disposed at a transmission side is well known as the powertrain type of the hybrid electric vehicle. In a typical TMED type hybrid electric vehicle, an engine clutch is interposed between an engine and a driving motor as driving sources, and a transmission is disposed at an output side of the driving motor, so that power of the engine and the driving motor are transmitted to front wheels as driving wheels through the transmission in a coupling state of the engine clutch.

In the TMED type hybrid electric vehicle, the engine and the driving motor are disposed together at the side of the front wheels as the driving wheels, so that only the driving torque of the front wheels is controlled by overlaying torques of the engine and the driving motor prior to the transmission and transmitting the overlayed torque through the transmission.

Alternatively, an electric 4 wheel drive (E-4WD) system in which a propeller shaft that is a mechanical power device is removed and a driving motor is applied to rear wheels in order to improve the efficiency of a vehicle is disclosed in U.S. Pat. No. 7,517,298.

In a hybrid electric vehicle to which the E-4WD system is applied, independent driving means are applied to front and rear wheels, respectively. In this case, an internal combustion engine (ICE) may be used as the driving means of the front wheels, and a driving motor may be used as the driving means of the rear wheels. The driving means may be driven independently or together according to a driving environmental condition.

In a typical E-4WD hybrid electric vehicle, the vehicle is basically driven in a 2 wheel drive (2WD) mode in which the vehicle is driven by using only any one of front and rear wheels as a driving wheel. When driving power is insufficient, the vehicle is driven in a 4WD mode in which the vehicle is driven by using the other wheel in an idle state as the driving wheel.

In the E-4WD hybrid electric vehicle, the drive mode is changed depending on a driving situation so as to improve fuel efficiency. For example, when a slip occurs due to sudden starting, slipper road, sandy soil, steep hill, muddy path, or the like, and therefore, high driving power is required, the vehicle is driven in the 4WD mode. In general high-speed driving, the vehicle is driven in the 2WD mode.

When the vehicle is driven in the 4WD mode, it is advantageous in terms of posture control or steering ability of the vehicle, climbing performance, and escape of rough road. However, in the 4WD mode, fuel efficiency is deteriorated as compared with that in the 2WD mode. When the vehicle is driven in the 2WD mode, driving torque is small, and there is no excess in terms of steering stability. However, in the case of a rainy road, snowy road or frozen road, the road surface friction coefficient of the road decreases, and hence the friction limit of tires also decreases. Therefore, it is difficult to control the posture of the vehicle.

Meanwhile, when the E-4WD hybrid electric vehicle is driven in the 4WD mode, the driving motor at the rear wheel side assists driving power required in the vehicle as described above. Therefore, it is required to efficiently distribute output torque of the engine and output torque of the driving motor.

Conventionally, a fixed distribution method of distributing power at a fixed ratio to the engine at the front wheel side and the driving motor at the rear wheel side was used as the method of distributing power to the engine at the front wheel side and the driving motor at the rear wheel side. However, in the fixed distribution method, the electric energy of a battery cannot be efficiently used, and the energy management of the battery is not efficiently performed.

In addition, studies on control of front/rear wheel torque, control of efficient front and rear wheel distribution, and the like for the purpose of vehicle stability according to a difference in wheel speed between front and rear wheels, a driver's intention of sudden acceleration, or a handling situation of a vehicle are unsatisfactory.

SUMMARY

The present disclosure provides a control method for torque distribution, in which in an electric 4 wheel drive (E-4WD) hybrid electric vehicle, improved torque distribution for front and rear wheels is performed according to a difference in wheel speed between the front and rear wheels, a driver's intention of sudden acceleration, or a handling situation of the vehicle, thereby improving the driving performance and stability of the vehicle.

In one aspect, the present disclosure provides a control method for front and rear wheel torque distribution of an E-4WD hybrid electric vehicle, the control method including: determining one of a fuel efficiency optimization mode and a 4WD mode as a driving mode from vehicle state information and driver's driving manipulation input information; calculating a driver request total torque amount from the vehicle state information and the driver's driving manipulation input information; when the 4WD mode is determined as the driving mode as the vehicle state information and the driving manipulation input information satisfy a 4WD mode condition, calculating a rear wheel torque amount for 4WD from the vehicle state information and the driving manipulation input information; calculating a front wheel torque amount for 4WD from the driver request total torque amount and the rear wheel torque amount for 4WD; calculating a front wheel engine torque amount for 4WD from the front wheel torque amount for 4WD; and controlling a torque output of an engine for front wheel driving and a torque output of a driving motor for rear wheel driving according to the calculated front wheel engine torque amount for 4WD and the calculated rear wheel torque amount for 4WD.

In an exemplary embodiment, as the 4WD mode condition in the determining of the driving mode, when there is satisfied any one of a condition in which a yaw rate error value calculated as a difference between a real yaw rate value detected by a yaw rate sensor and a target yaw rate value for vehicle handling control is not less than a predetermined first reference value, a condition in which a difference in wheel speed between front and rear wheels is not less than a predetermined second reference value, and a condition in which an accelerator pedal acceleration value according to a driver's accelerator pedal manipulation is not less than a predetermined third reference value, the driving mode may be determined as the 4WD mode.

In another exemplary embodiment, the driver request total torque amount may be evaluated from a request engine torque amount according to a driver accelerator pedal manipulation amount, a reduction ratio of a torque converter at the engine output side, a reduction ratio of a transmission at the engine output side, a reduction ratio of a front wheel differential gear, and a total efficiency of a driving system of the vehicle.

In still another exemplary embodiment, if the 4WD mode is determined as the condition in which the accelerator pedal acceleration value according to the driver's accelerator pedal manipulation is not less than the predetermined third reference value is satisfied, a sudden acceleration control torque evaluated from an output torque of the transmission at the engine output side, a final reduction gear ratio of the front wheels, and a load distribution ratio of the vehicle may be determined as the rear wheel torque amount for 4WD.

In yet another exemplary embodiment, the load distribution ratio $R_{Ratio}$ of the vehicle may be evaluated by an equation of $$R_{ratio} = \frac{W_r}{W}$$

from a rear wheel operation load $W_r$ and a vehicle static load W, and the rear wheel operation load $W_r$ may be evaluated by an equation of $$W_r = W_{rs} + W \frac{a_x}{g} \frac{h}{L}.$$

Here, $W_{rs}$ is a rear wheel static load, $a_x$ is a final acceleration of the vehicle, g is a gravitational acceleration, h is a height of the centroid of the vehicle, and L is a wheel base of the vehicle.

In still yet another exemplary embodiment, if the 4WD mode is determined as the condition in which the difference in wheel speed between the front and rear wheels is not less than the predetermined third reference value is satisfied, a slip control torque $T_{slipcontrol}$ evaluated by an equation of $$T_{slipcontrol} = K_P \cdot \Delta\omega + K_I \int_0^t \Delta\omega \, dt$$

from the difference in wheel speed between the front and rear wheels may be determined as the rear wheel torque amount for 4WD.

Here, $K_P$, $K_I$ are P and I control gains, respectively, $\Delta\omega$ is a difference in wheel speed between the front and rear wheels, and t is a time.

In a further exemplary embodiment, if the 4WD mode is determined as the condition in which the yaw rate error value calculated as the difference between the real yaw rate value detected by the yaw rate sensor and the target yaw rate value for vehicle handling control is not less than a predetermined first reference value is satisfied, a handling control torque $T_{landing}$ evaluated by an equation of $T_{handling} = K_P \cdot \gamma_{error}$ from the yaw rate error value $\gamma_{error}$ may be determined as the rear wheel torque amount for 4WD.

Here, $K_P$, is a P control gain.

In another further exemplary embodiment, the target yaw rate value may be evaluated by an equation of $$\gamma_{ref} = \frac{V \cdot \delta}{\left(1 + \left(\frac{V}{V_{ch}}\right)^2\right) \cdot L}$$

from a vehicle speed V and a steering angle $\delta$.

Here, $V_{ch}$ is an intrinsic handling characteristic speed of the vehicle, and L is a wheel base of the vehicle.

In still another further exemplary embodiment, the front wheel torque amount $T_{FWheel\_4WD}$ for 4WD may be evaluated as a value obtained by subtracting the rear wheel torque amount $T_{RWheel\_4WD}$ for 4WD from the driver request total torque amount $T_{totalDriver}$.

In yet another further exemplary embodiment, the front wheel engine torque amount $TQI_{4WD}$ for 4WD may be evaluated by an equation of $$TQI_{4WD} = \frac{T_{FWheel\_4WD}}{R_{TC} \times R_{Trans} \times R_{Diff} \times \eta_{total}}$$

from the front wheel torque amount $T_{FWheel\_4WD}$ for 4WD.

Here, $R_{TC}$ is a reduction ratio of the torque converter at the engine output side, $R_{Trans}$ is a reduction ratio of the transmission at the engine output side, $R_{Diff}$ is a reduction ratio of the front wheel differential gear, and $\eta_{total}$ is a total efficiency of the driving system of the vehicle.

In still yet another further exemplary embodiment, the control method may further include: when the fuel efficiency optimization mode is determined as the 4WD mode condition is not satisfied, calculating an optimal engine torque amount from an optimal fuel efficiency map based on the vehicle state information and the driving manipulation input information; calculating a front wheel optimal wheel torque amount corresponding to the optimal engine torque amount; calculating a rear wheel torque amount from the driver request total torque amount and the front wheel optimal wheel torque amount; and controlling the torque output of the engine for front wheel driving and the torque output of the driving motor for rear wheel driving according to the calculated optimal engine torque amount and the calculated rear wheel torque amount.

In a still further exemplary embodiment, the optimal engine torque amount may be evaluated using the optimal fuel efficiency map from a gear shift stage, an accelerator pedal amount according to a driving manipulation, and an engine speed.

In a yet still further exemplary embodiment, the front wheel optimal torque amount $T_{FWheel\_Fuel}$ may be evaluated by an equation of $T_{FWheel\_Fuel} = TQI_{optimal} \times R_{TC} \times R_{Trans} \times R_{Diff} \times \eta_{total}$ from the optimal engine torque amount $TQI_{optimal}$.

Here, $R_{TC}$ is a reduction ratio of the torque converter at the engine output side, $R_{Trans}$ is a reduction ratio of the transmission at the engine output side, $R_{Diff}$ is a reduction ratio of the front wheel differential gear, and $\eta_{total}$ is a total efficiency of the driving system of the vehicle.

In yet further exemplary embodiment, the rear wheel torque amount may be evaluated as a value obtained by subtracting the front wheel optimal wheel torque amount from the driver request total torque amount.

Other aspects and exemplary embodiments of the present disclosure are discussed infra.

According to the control method of the present disclosure, torque distribution emphasized on fuel efficiency is performed according to a difference in wheel speed between the front and rear wheels, a driver's intention of sudden acceleration, or a handling situation of the vehicle, or torque distribution control in the 4WD mode is performed in order to prevent the occurrence of a front/rear wheel slip, provide sudden acceleration performance, and improve a handling situation, thereby increasing the driving performance and stability of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is intended to cover not only the exemplary embodiments, but also various alternatives, modifications, equivalents and other embodiments, which may be included within the spirit and scope of the present disclosure as defined by the appended claims.

The present disclosure provides a control method for torque distribution to front wheels (an engine) and rear wheels (a driving motor) in an electric 4 wheel drive (E-4WD) hybrid electric vehicle.

Particularly, the present disclosure provides a control method for torque distribution, in which, in an E-4WD hybrid electric vehicle, improved torque distribution for front and rear wheels is performed according to a difference in wheel speed between the front and rear wheels, a driver's intention of sudden acceleration, or a handling situation of the vehicle, thereby improving the driving performance and stability of the vehicle.

Figure 1:
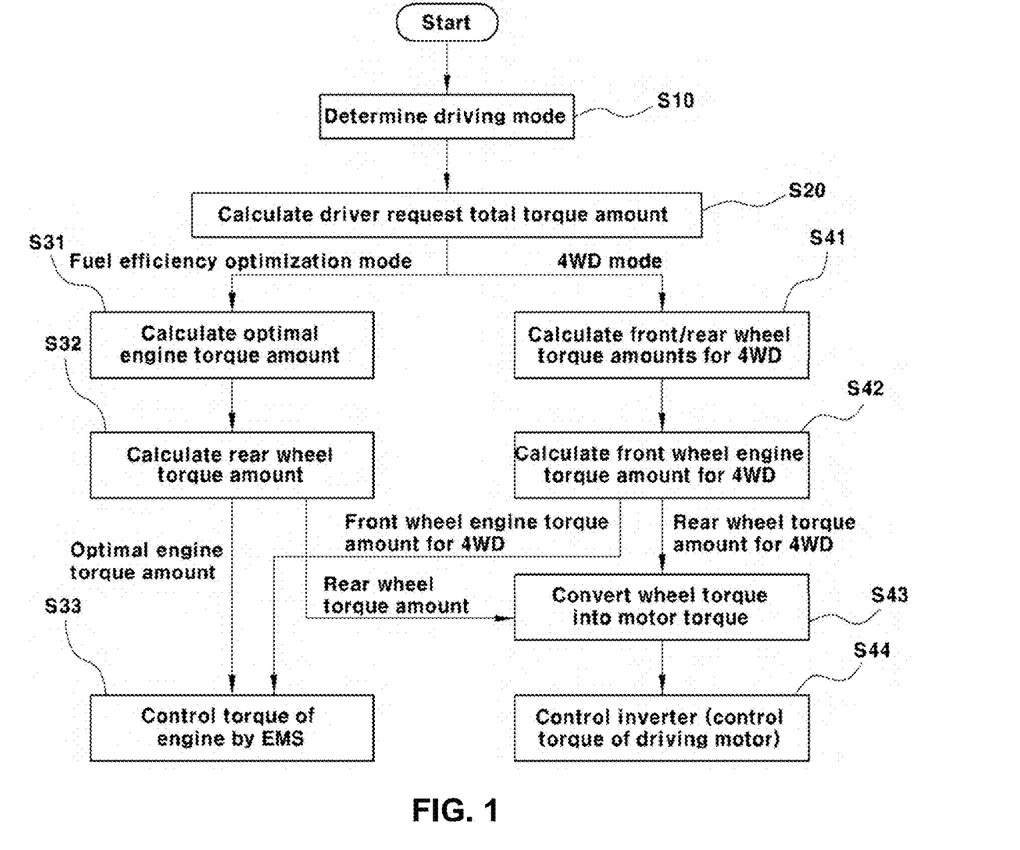
FIG. 1 is a flowchart illustrating a control method according to an embodiment of the present disclosure.
Figure 2:
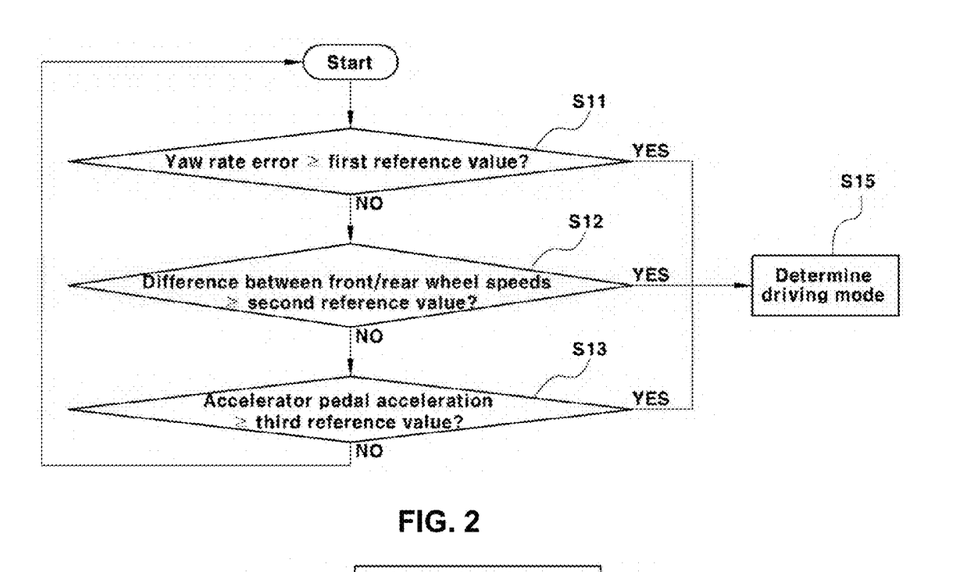
FIG. 2 is a flowchart illustrating a method for determining a driving mode in the control method according to the embodiment of the present disclosure.
Figure 3:
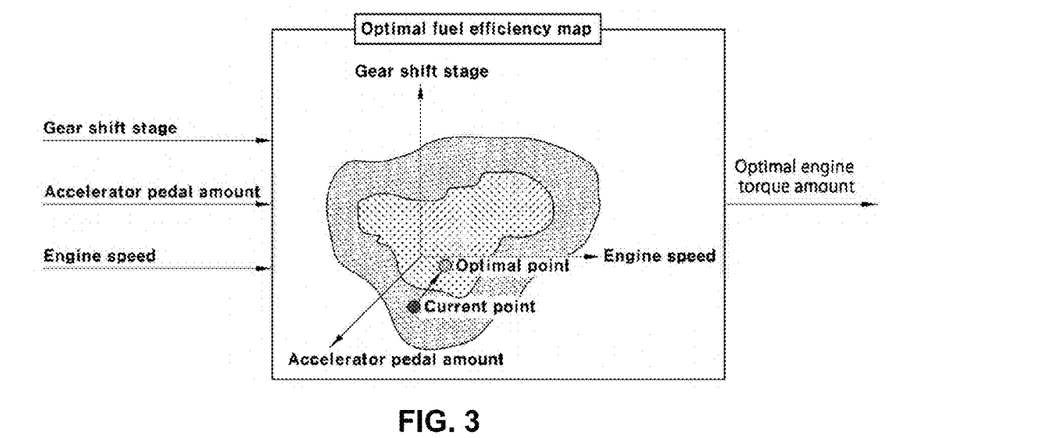
FIG. 3 is a view illustrating a method for calculating an optimal engine torque amount in the control method according to the embodiment of the present disclosure.

FIG. 1 is a flowchart illustrating a control method according to an embodiment of the present disclosure. FIG. 2 is a flowchart illustrating a method for determining a driving mode in the control method according to the embodiment of the present disclosure. FIG. 3 is a view illustrating a method for calculating an optimal engine torque amount in the control method according to the embodiment of the present disclosure.

First, the control method of the present disclosure may be performed by cooperative control of a hybrid control unit that is a top-level controller, an engine management system (EMS) that controls driving of an engine, and a motor control unit (MCU) that controls driving of a motor.

For example, the control subject in steps S10, S20, S31, S32, S41, S42 and S43 of FIG. 1 and steps S11 to S14 of FIG. 2 may be the HCU. The control subject in step S33 of FIG. 1 may be the EMS. The control subject in step S44 of FIG. 1 may be the MCU.

As shown in FIG. 1, in the control method of the present disclosure, any one of a fuel efficiency optimization mode and a 4WD mode is determined as a driving mode (S10), and a driving wheel torque of the entire vehicle, which a driver requests during vehicle driving, i.e., a driver request total torque amount $T_{TotalDriver}$ is calculated based on driver's driving manipulation input information (S20). Then, the distribution amount of front/rear wheel driving torque is controlled according to the fuel efficiency optimization mode or the 4WD mode.

Here, the fuel efficiency optimization mode is a driving mode for improving fuel efficiency in an electric vehicle (EV) mode (motor only mode) and 2 wheel drive (2WD) mode such as an engine only mode, including a 4 wheel drive (4WD) mode such as a hybrid electric vehicle (HEV) mode. The 4WD mode is a driving mode for implementing 4WD performance in order to improve starting and acceleration performance, assist vehicle climbing, escape a rough road, and improve handling performance.

The fuel efficiency optimization mode is a driving mode used as the concept including not only torque distribution (HEV 4WD driving) of the engine and the driving motor, which is emphasized on fuel efficiency, but also torque control of the driving motor in the EV mode using only power of the driving motor as a pure electric vehicle mode and torque control of the engine in the engine only mode using only power of the engine.

The 4WD mode is a 4WD mode for decreasing a difference in wheel speed between front and rear wheels, increasing a rear wheel driving amount or improving a handling situation and promoting vehicle stability, when the difference in wheel speed between the front and rear wheels is increased due to a slip of the front/rear wheels to a predetermined level or more, when the driver intends to perform sudden acceleration, or when the handling situation is deteriorated.

First, in the step of determining the driving mode (S10), the driving mode is determined based on vehicle state information on and driver's driving manipulation input information as shown in FIG. 2. Here, the vehicle state information may be yaw rate information representing a handling situation of the vehicle and front/rear wheel speed information representing a slip state of wheels, and the driving manipulation input information may be acceleration pedal manipulation information representing a driver's acceleration intention.

The yaw rate information may be a yaw rate error value representing a difference between a target yaw rate value and a real yaw rate value. Here, the target yaw rate value is a target value for vehicle handling control, and the real yaw rate value is a sensor detection value acquired by a yaw rate sensor of the vehicle.

The front/rear wheel speed information may be a difference in wheel speed between the front and rear wheels, acquired by a wheel speed sensor, i.e., a front/rear wheel speed difference value, and the accelerator pedal manipulation information may be an acceleration value in a driver's accelerator pedal manipulation (accelerator pedal acceleration value), which is evaluated from an accelerator position sensor (APS) signal.

In the present disclosure, when a predetermined 4WD condition, e.g., as shown in FIG. 2, there is satisfied any one of a condition in which the yaw rate error value of the vehicle is not less than a predetermined first reference value, a condition in which the front/rear wheel speed difference value is not less than a predetermined second reference value, and a condition in which the accelerator pedal acceleration value is not less than a predetermined third reference value, the driving mode is determined as the 4WD mode. When all the conditions are not satisfied, the driving mode is determined as the fuel efficiency optimization mode.

Subsequently, a driver request total torque amount $T_{TotalDriver}$ is calculated based on the vehicle state information and the driver's driving manipulation input information (S20).

The driver request total torque amount $T_{TotalDriver}$ is a value calculated to control driving of a general E-4WD hybrid electric vehicle, and various methods are known as the method for calculating the value. For example, the value may be evaluated from a request engine torque amount TQI according to an accelerator pedal amount (i.e., an accelerator pedal manipulation amount, an APS signal value), a reduction ratio $R_{TC}$ of a torque converter at the engine output side, a reduction ratio $R_{Trans}$ of a transmission at the engine output side, a reduction ratio (differential reduction ratio) $R_{Diff}$ of a front wheel differential gear, and a total efficiency $\eta_{total}$ of a driving system of the vehicle. The following Equation 1 represents a calculation formula for calculating the driver request total torque amount $T_{TotalDriver}$.

$$T_{TotalDrive}=TQI \times R_{TC} \times R_{Trans} \times R_{Diff} \times \eta_{total} \quad \text{Equation 1}$$

In the present disclosure, the calculation of the driver request total torque amount is not limited to the equation, and any one of several calculation methods known in the art may be used. The calculation formula may be set to reflect information on a vehicle speed, yaw rate, wheel speed or speed change state (gear shift stage) as the vehicle state information and information on a steering angle or brake pedal manipulation value as the driving manipulation input information.

If the driver request total torque amount is calculated as described above, a front/rear wheel torque amount is calculated according to the driving mode, and the torque control of the engine (the engine only mode or the 2WD mode), the torque control of the driving motor (the EV mode or the 2WD mode) or the torque control of the engine and the driving motor (the HEV mode or the 4WD mode) is performed according to the calculated torque amount.

First, in the step of determining the driving mode, if the driving mode is determined as the fuel efficiency optimization mode, there are performed a step of calculating an optimal engine torque amount $TQI_{optimal}$, a step of calculating a rear wheel torque amount $T_{RWheel\_Fuel}$, and an fuel efficiency optimization torque control step of controlling the torque output of the engine for front wheel driving and the torque output of the driving motor for rear wheel driving according to the calculated torque amounts, i.e., the optimal engine torque amount $TQI_{optimal}$ and the rear wheel torque amount $T_{RWheel\_Fuel}$ (S31, S32, S33, and S44).

In the fuel efficiency optimization mode, an optimal front and rear wheel torque distribution amount is calculated based on the driver request total torque amount and the like, and the driver request total torque amount can be satisfied through engine torque control at the front wheel side and motor torque control of the rear wheel side.

In the step of calculating the optimal engine torque amount (S31), the optimal engine torque amount $TQI_{optimal}$ for fuel efficiency optimization is calculated based on the vehicle state information and the driver's driving manipulation input information.

That is, as shown in FIG. 3, the reduction state (gear shift stage), the accelerator pedal amount according to the driving manipulation, and the optimal engine torque amount $TQI_{optimal}$ from an engine speed (RPM) may be evaluated using an optimal fuel efficiency map.

Since an optimal driving section in which fuel consumption amount for each engine is least is selected and reflected in the optimal fuel efficiency map, an engine torque amount corresponding to an optimal point may be evaluated based on current vehicle state information and driving manipulation input information.

In the step of calculating the rear wheel torque amount (S32), a front wheel torque amount $T_{FWheel\_Fuel}$ corresponding to the optimal engine torque amount $TQI_{optimal}$ is evaluated, and a rear wheel torque amount $T_{RWheel\_Fuel}$ is calculated from the driver request total torque amount $T_{TotalDriver}$ and the front wheel torque amount $T_{FWheel\_Fuel}$.

The front wheel torque amount $T_{FWheel\_Fuel}$ may be evaluated from the optimal engine torque amount $TQI_{optimal}$, the reduction ratio $R_{TC}$ of the torque converter at the engine output side, the reduction ratio $R_{Trans}$ of the transmission at the engine output side, the reduction ratio (differential reduction ratio) $R_{Diff}$ of the front wheel differential gear, and the total efficiency $\eta_{total}$ of a driving system of the vehicle. The following Equation 2 represents a calculation formula for calculating the front wheel optimal wheel torque amount $T_{FWheel\_Fuel}$ corresponding to the optimal engine torque amount $TQI_{optimal}$.

$$T_{FWheel\_Fuel}=TQI_{optimal} \times R_{TC} \times R_{Trans} \times R_{Diff} \times \eta_{total} \quad \text{Equation 2}$$

As a result, the rear wheel torque amount $T_{RWheel\_Fuel}$ may be calculated as a value obtained by subtracting the front wheel optimal wheel torque amount $T_{FWheel\_Fuel}$ from the driver request total torque amount $T_{TotalDriver}$ ($T_{RWheel\_Fuel}=T_{TotalDriver}-T_{FWheel\_Fuel}$).

Subsequently, in the torque control step, the output torque of the engine and the output torque of the driving motor are controlled according to the optimal engine torque amount $TQI_{optimal}$ and the rear wheel torque amount $T_{RWheel\_Fuel}$, which are evaluated as described above, so that driving power distribution for the engine (front wheels) and the driving motor (rear wheels) is performed.

The EMS may control engine driving using the as an instruction value, thereby performing the torque control of the engine. The MCU may control motor driving through an inverter using, as an instruction value, a motor torque $T_{RearMotor}$ converted from the rear wheel torque amount $T_{RWheel\_Fuel}$, thereby performing the torque control of the driving motor.

The following Equation 3 may be used as a calculation formula for converting the rear wheel torque amount $T_{RWheel\_Fuel}$ into the motor torque $T_{RearMotor}$.

$$T_{RearMotor} = T_{RWheel\_Fuel} \div R_{Reduction} \qquad \text{Equation 3}$$

Here, $R_{Reduction}$ denotes a gear ratio of a motor decelerator connected to the driving motor at the rear wheel side.

Next, if the driving mode is determined as the 4WD mode in the step of determining the driving mode, there are performed a step of calculating front/rear wheel torque amounts $T_{FWheel\_4WD}$ and $T_{RWheel\_4WD}$ for 4WD (S41), a step of calculating a front wheel engine torque amount $TQI_{4WD}$ for 4WD (S42), and a 4WD torque control step of controlling the torque output of the engine for front wheel driving and the torque output of the driving motor for rear wheel driving (S33, S43, and S44).

If the difference between the front/rear wheel speeds is large in the 4WD mode, control is performed in the direction to decrease the difference between the front/rear wheel speeds. If the driver's intention of sudden acceleration is recognized, control of increasing the rear wheel driving amount is performed. The engine torque control at the front wheel side and the motor torque control at the rear wheel side are performed by calculating front and rear wheel torque amounts for stability of the vehicle according to a yaw rate error value in a handling situation.

In the step of calculating the front/rear wheel torque amounts $T_{FWheel\_4WD}$ and $T_{RWheel\_4WD}$ for 4WD (S41), the rear wheel torque amount $T_{RWheel\_4WD}$ for 4WD is first calculated, and the front wheel torque amount $T_{FWheel\_4WD}$ for 4WD is then calculated as a value obtained by subtracting the rear wheel torque amount $T_{RWheel\_4WD}$ for 4WD from the driver request total torque amount $T_{TotalDriver}$.

Here, the process of calculating the rear wheel torque amount $T_{RWheel\_4WD}$ for 4WD will be described as follows.

First, when the 4WD mode is determined as the driver suddenly manipulates an accelerator pedal of the vehicle so that the accelerator pedal acceleration is not less than the third reference value (see step S13 of FIG. 2), it is determined that the driver has an intention of sudden acceleration, and thus the driving power of the rear wheels is increased so that the sudden acceleration of the vehicle is performed. To this end, a sudden acceleration control torque $T_{Accel}$ evaluated from the following Equation 4 is determined and used as the rear wheel torque amount $T_{RWheel\_4WD}$.

$$T_{Accel} = T_{TM} \times G_f \times R_{ratio} \qquad \text{Equation 4}$$

Here, $T_{Accel}$ denotes a value corresponding to the rear wheel torque amount $T_{RWheel\_4WD}$. When it is determined that the driver has an intention of sudden acceleration, $T_{Accel}$ is used as the rear wheel torque amount $T_{RWheel\_4WD}$ for 4WD. $T_{TM}$ denotes a transmission output torque, $G_f$ denotes is a final reduction gear ratio of the front wheels, and $R_{ratio}$ denotes a load distribution ratio of the vehicle.

The transmission output torque $T_{TM}$ may be calculated as a value obtained by multiplying an engine output torque of the driving vehicle by a current gear ratio of the gear shift stage.

The load distribution ratio $R_{ratio}$ may be evaluated from the following Equation 5.

$$R_{ratio} = \frac{W_r}{W} \qquad \text{Equation 5}$$

Here, $W_r$ denotes a rear wheel operation load evaluated from the following Equation 6, and W denotes a vehicle static load.

$$W_r = W_{rs} + W \frac{a_x}{g} \frac{h}{L} \qquad \text{Equation 6}$$

Here, $W_{rs}$ denotes a rear wheel static load, W denotes a vehicle static load, $a_x$ denotes a final acceleration of the vehicle, detected by a sensor, g denotes a gravitational acceleration, h denotes a height of the centroid of the vehicle, and L denotes a wheel base of the vehicle.

Next, when the 4WD mode is determined as the difference in wheel speed between the front and rear wheels is not less than the second reference value (see step S12 of FIG. 2), a slip control torque $T_{slipcontrol}$ evaluated from the following Equation 7 is determined and used as the rear wheel torque amount $T_{RWheel\_4WD}$ for 4WD in order to decrease the difference in wheel speed between the front and rear wheels.

$$T_{slipcontrol} = K_P \cdot \Delta\omega + K_I \int_0^t \Delta\omega \, dt \qquad \text{Equation 7}$$

Here, $K_P$, $K_I$ denote P and I control gains, respectively, $\Delta\omega$ denotes a difference in wheel speed between the front and rear wheels, and t denotes a time.

The difference $\Delta\omega$ in wheel speed between the front and rear wheels may be evaluated as a difference in wheel speed average between rear left and rear right wheels as shown in Equation 8.

$$\Delta\omega = \left| \frac{\omega_{fl} + \omega_{fr}}{2} \right| - \left| \frac{\omega_{rl} + \omega_{rr}}{2} \right| \qquad \text{Equation 8}$$

Here, $\omega_{fl}$, $\omega_{fr}$, $\omega_{rl}$, and $\omega_{rr}$ are wheel speeds of the wheels, which are detected by the wheel speed sensor, and denote wheel speeds of front left, front right, rear left and rear right wheels, respectively.

Meanwhile, when the 4WD mode is determined as the yaw rate error value is not less that the first reference value (see step S11 of FIG. 2), a handling control torque $T_{handing}$ evaluated by the following Equation 9 from the yaw rate error value is determined and used as the rear wheel torque amount $T_{RWheel\_4WD}$ for 4WD.

$$T_{handling} = K_P \cdot \gamma_{error} \qquad \text{Equation 9}$$

Here, $K_P$ denotes a P control gain, and $\gamma_{error}$ denotes a yaw rate error value evaluated from the following Equation 10.

$$\gamma_{error} = \gamma_{ref} - \gamma_{real} \qquad \text{Equation 10}$$

In Equation 10, $\gamma_{real}$ denotes a real yaw rate value detected by a yaw rate sensor of the vehicle, and $\gamma_{ref}$ denotes a target yaw rate value evaluated from the following Equation 11.

$$\gamma_{ref} = \frac{V \cdot \delta}{\left(1 + \left(\frac{V}{V_{ch}}\right)^2\right) \cdot L} \quad \text{Equation 11}$$

Here, V denotes a vehicle speed, $V_{ch}$ denotes an intrinsic handling characteristic speed of the vehicle, $\delta$ denotes a steering angle detected by a steering angle sensor, and L denotes a wheel base of the vehicle.

Meanwhile, if the rear wheel torque amount $T_{RWheel\_4WD}$ for 4WD is evaluated according to the vehicle state information and the driving manipulation input information, the front wheel torque amount $T_{FWheel\_4WD}$ for 4WD may be determined from the driver request total torque amount $T_{TotalDriver}$ and the rear wheel torque amount $T_{RWheel\_4WD}$ for 4WD (S41). Subsequently, the front wheel engine torque amount $TQI_{4WD}$ for 4WD evaluated may be calculated by the following Equation 12 from the front wheel torque amount $T_{FWheel\_4WD}$ for 4WD.

$$TQI_{4WD} = \frac{T_{FWheel\_4WD}}{R_{TC} \times R_{Trans} \times R_{Diff} \times \eta_{total}} \quad \text{Equation 12}$$

Here, $R_{TC}$ denotes a reduction ratio of the torque converter at the engine output side, $R_{Trans}$ denotes a reduction ratio of the transmission at the engine output side, $R_{Diff}$ denotes a reduction ratio (differential reduction ratio) of the front wheel differential gear, and $\eta_{total}$ denotes a total efficiency of the driving system of the vehicle.

If the front wheel engine torque amount $TQI_{4WD}$ for 4WD is evaluated as described above, torque control for the engine (front wheels) and the driving motor (rear wheels) is also performed according to the evaluated torque value in the 4WD mode. In the torque control step, the output torque of the engine and the output torque of the driving motor are controlled according to the evaluated front wheel engine torque amount $TQI_{4WD}$ for 4WD and the evaluated rear wheel torque amount $T_{RWheel\_4WD}$ for 4WD, so that the driving power distribution for the engine (front wheels) and the driving motor (rear wheels) is performed (S33, S34, and S44).

The torque control of the engine may be performed by controlling engine driving using the front wheel engine torque amount $TQI_{4WD}$ for 4WD as an instruction value (S33). The torque control of the driving motor may be performed by converting the rear wheel torque amount $T_{RWheel\_4WD}$ for 4WD into the motor torque $T_{RearMotor}$ (S43) and controlling, by the MCU), motor driving through the inverter using the converted motor torque as an instruction value (S44).

The following Equation 13 may be used as a calculation formula for converting the rear wheel torque amount $T_{RWheel\_4WD}$ for 4WD into the motor torque $T_{RearMotor}$.

$$T_{RearMotor} = T_{RWheel\_4WD} \div R_{Reduction} \quad \text{Equation 13}$$

Here, $R_{Reduction}$ denotes a gear ratio of the motor decelerator connected to the driving motor at the rear wheel side.

The present disclosure has been described in detail with reference to exemplary embodiments thereof. However, it will be appreciated by those skilled in the art that changes may be made in these embodiments without departing from the principles and spirit of the present disclosure, the scope of which is defined in the appended claims and their equivalents.

What is claimed is:

1. A control method for front and rear wheel torque distribution of an electric 4 wheel drive (E-4WD) hybrid electric vehicle, the control method comprising:
   determining by a hybrid control unit one of a fuel efficiency optimization mode and a 4WD mode as a driving mode from vehicle state information and driver's driving manipulation input information;
   calculating by the hybrid control unit a driver request total torque amount from the vehicle state information and the driver's driving manipulation input information;
   when the 4WD mode is determined as the driving mode as the vehicle state information and the driving manipulation input information satisfy a 4WD mode condition, the hybrid control unit calculates a rear wheel torque amount for 4WD from the vehicle state information and the driving manipulation input information;
   calculating by the hybrid control unit a front wheel torque amount for the 4WD from the driver request total torque amount and the rear wheel torque amount for the 4WD;
   calculating by the hybrid control unit a front wheel engine torque amount for the 4WD from the front wheel torque amount for the 4WD; and
   controlling a torque output of an engine for front wheel driving by an engine management system and controlling a torque output of a driving motor for rear wheel driving by a motor control unit according to the calculated front wheel engine torque amount for the 4WD and the calculated rear wheel torque amount for the 4WD.

2. The control method according to claim 1, wherein, as the 4WD mode condition in the determining of the driving mode, when there is satisfied any one of a condition in which a yaw rate error value calculated as a difference between a real yaw rate value detected by a yaw rate sensor and a target yaw rate value for vehicle handling control is not less than a predetermined first reference value, a condition in which a difference in wheel speed between front and rear wheels is not less than a predetermined second reference value, and a condition in which an accelerator pedal acceleration value according to a driver's accelerator pedal manipulation is not less than a predetermined third reference value, the driving mode is determined as the 4WD mode.

3. The control method according to claim 1, wherein the driver request total torque amount is evaluated from a request engine torque amount according to a driver accelerator pedal manipulation amount, a reduction ratio of a torque converter at an engine output side, a reduction ratio of a transmission at the engine output side, a reduction ratio of a front wheel differential gear, and a total efficiency of a driving system of the vehicle.

4. The control method according to claim 1, wherein, if the 4WD mode is determined as a condition in which an accelerator pedal acceleration value according to a driver's accelerator pedal manipulation is not less than a predetermined third reference value is satisfied, a sudden acceleration control torque evaluated from an output torque of a transmission at an engine output side, a final reduction gear ratio of front wheels, and a load distribution ratio of the vehicle is determined as the rear wheel torque amount for the 4WD.

5. The control method according to claim 4, wherein the load distribution ratio ($R_{Ratio}$) of the vehicle is evaluated by an equation of $$R_{ratio} = \frac{W_r}{W}$$

from a rear wheel operation load $W_r$ and a vehicle static load W, and a rear wheel operation load $W_r$ is evaluated by an equation of $$W_r = W_{rs} + W \frac{a_x}{g} \frac{h}{L},$$

wherein $W_{rs}$ is a rear wheel static load, $a_x$ is a final acceleration of the vehicle, g is a gravitational acceleration, h is a height of the centroid of the vehicle, and L is a wheel base of the vehicle.

6. The control method according to claim 1, wherein, if the 4WD mode is determined as a condition in which a difference in wheel speed between the front and rear wheels is not less than a predetermined third reference value is satisfied, a slip control torque $T_{slipcontrol}$ evaluated by an equation of $$T_{slipcontrol} = K_P \cdot \Delta\omega + K_I \int_0^t \Delta\omega \, dt$$

from the difference in wheel speed between the front and rear wheels is determined as the rear wheel torque amount for the 4WD,
wherein $K_P$, $K_I$ are P and I control gains, respectively, $\Delta\omega$ is a difference in wheel speed between the front and rear wheels, and t is a time.

7. The control method according to claim 1, wherein, if the 4WD mode is determined as a condition in which a yaw rate error value calculated as a difference between a real yaw rate value detected by a yaw rate sensor and a target yaw rate value for vehicle handling control is not less than a predetermined first reference value is satisfied, a handling control torque $T_{handling}$ evaluated by an equation of $T_{handling} = K_P \cdot \gamma_{error}$ from the yaw rate error value $\gamma_{error}$ is determined as the rear wheel torque amount for the 4WD,
wherein $K_P$, is a P control gain.

8. The control method according to claim 7, wherein the target yaw rate value is evaluated by an equation of $$\gamma_{ref} = \frac{V \cdot \delta}{\left(1 + \left(\frac{V}{V_{ch}}\right)^2\right) \cdot L}$$

from a vehicle speed V and a steering angle $\delta$,
wherein $V_{ch}$ is an intrinsic handling characteristic speed of the vehicle, and L is a wheel base of the vehicle.

9. The control method according to claim 1, wherein the front wheel torque amount ($T_{FWheel\_4WD}$) for the 4WD is evaluated as a value obtained by subtracting the rear wheel torque amount ($T_{RWheel\_4WD}$) for the 4WD from the driver request total torque amount ($T_{totalDriver}$).

10. The control method according to claim 1, wherein the front wheel engine torque amount ($TQI_{4WD}$) for the 4WD is evaluated by an equation of $$TQI_{4WD} = \frac{T_{FWheel\_4WD}}{R_{TC} \times R_{Trans} \times R_{Diff} \times \eta_{total}}$$

from the front wheel torque amount ($T_{FWheel\_4WD}$) for the 4WD,
wherein $R_{TC}$ is a reduction ratio of a torque converter at an engine output side, $R_{Trans}$ is a reduction ratio of a transmission at the engine output side, $R_{Diff}$ is a reduction ratio of a front wheel differential gear, and $\eta_{total}$ is a total efficiency of a driving system of the vehicle.

11. The control method according to claim 1, further comprising:
when the fuel efficiency optimization mode is determined as the 4WD mode condition is not satisfied, calculating an optimal engine torque amount from an optimal fuel efficiency map based on the vehicle state information and the driving manipulation input information;
calculating by the hybrid control unit a front wheel optimal wheel torque amount corresponding to an optimal engine torque amount;
calculating by the hybrid control unit a rear wheel torque amount from the driver request total torque amount and the front wheel optimal wheel torque amount; and
controlling the torque output of the engine for front wheel driving and the torque output of the driving motor for rear wheel driving according to the calculated optimal engine torque amount and the calculated rear wheel torque amount.

12. The control method according to claim 11, wherein the optimal engine torque amount is evaluated using the optimal fuel efficiency map from a gear shift stage, an accelerator pedal amount according to a driving manipulation, and an engine speed.

13. The control method according to claim 11, wherein the front wheel optimal torque amount ($T_{FWheel\_Fuel}$) is evaluated by an equation of $T_{FWheel\_Fuel} = TQI_{optimal} \times R_{TC} \times R_{Trans} \times R_{Diff} \times \eta_{total}$ from the optimal engine torque amount ($TQI_{optimal}$),
wherein $R_{TC}$ is a reduction ratio of a torque converter at the engine output side, $R_{Trans}$ is a reduction ratio of a transmission at the engine output side, $R_{Diff}$ is a reduction ratio of a front wheel differential gear, and $\eta_{total}$ is a total efficiency of the driving system of the vehicle.

14. The control method according to claim 11, wherein the rear wheel torque amount is evaluated as a value obtained by subtracting the front wheel optimal wheel torque amount from the driver request total torque amount.

* * * * *